United States Patent [19]
Moori et al.

[11] 3,910,388
[45] Oct. 7, 1975

[54] SHIFTER WITH SWITCHES FOR SEQUENTIALLY OPERATING A TRANSMISSION AND CLUTCH

[75] Inventors: Yooichi Moori; Tooji Takemura, both of Yokohama, Japan

[73] Assignee: Nissan Motor Company Limited, Yokohama, Japan

[22] Filed: May 14, 1974

[21] Appl. No.: 469,898

Related U.S. Application Data

[63] Continuation-in-part of Ser. No. 386,401, Aug. 7, 1973, abandoned.

[52] U.S. Cl. ............ 192/3.56; 192/3.58; 200/61.88

[51] Int. Cl.² ........................................ B60K 21/00
[58] Field of Search ........................... 192/3.56, 3.58

[56] References Cited
UNITED STATES PATENTS

| | | | |
|---|---|---|---|
| 2,846,036 | 8/1958 | Maurice et al. | 192/3.56 |
| 2,945,100 | 7/1960 | Maurice et al. | 192/3.56 |

Primary Examiner—Benjamin W. Wyche

[57] ABSTRACT

Switches which quickly disengage a clutch when a gearshift lever is moved, and engage the clutch when the shifting operation is completed.

2 Claims, 7 Drawing Figures

SHIFTER WITH SWITCHES FOR SEQUENTIALLY OPERATING A TRANSMISSION AND CLUTCH

This invention is a continuation-in-part of application Ser. No. 386,401 filed on Aug. 7, 1973 and now abandoned.

This invention relates in general to control apparatus for a clutch of a power transmission of a wheeled vehicle such as an automobile and, more particularly, to an electric control device for a clutch.

A type of conventional power transmission in common use comprises a clutch to selectively connect and disconnect the transmission and the engine which does not have a separate control pedal or lever, but is arranged to be actuated by a gearshift lever. The gearshift lever may be connected to the clutch through a mechanical linkage or an auxiliary apparatus such as a hydraulic or pneumatic device. This auxiliary apparatus is usually combined with an electric control device having a gearshift lever switch which is incorporated in the gearshift lever and which is closed when the driver grasps or touches the gearshift lever before shifting gears. The gearshift switch is electrically connected to a relay or a solenoid for actuating the clutch. The electric control device is arranged such that if the driver grasps the gearshift lever to shift gears, the gearshift lever switch closes so that electric current is supplied to the relay or solenoid and the clutch is disengaged. Conversely, when the driver releases the gearshift lever, the gearshift lever switch opens and the clutch is engaged to allow the engine to move the vehicle. A difficulty is encountered in this prior art electric control device in that there exists a time lag before the clutch engages after the driver releases the gearshift lever, inviting abrasion of the clutch fases, racing of the engine, and other undesirable effects.

It is therefore an object of the present invention to provide an improved electric control device for a clutch of a power transmission of a wheeled vehicle.

Another object of the present invention is to provide an electric control device for controlling a clutch of a power transmission which is operated by a gearshift lever.

Another object of the present invention is to provide an electric control device by which a clutch is engaged immediately upon completion of a gearshifting operation.

Still another object of the present invention is to provide an electric control device which causes a clutch of a power transmission to engage even before a driver releases a gearshift lever.

A further object of the present invention is to provide an electric control device which causes a clutch to quickly engage to facilitate rapid shifting of gears of a power transmission.

A further object of the present invention is to provide an electric control device for a clutch of a power transmission of a wheeled vehicle which minimizes abrasion of the clutch faces, racing of the engine and other undesirable effects.

A still further object of the present invention is to provide an electric control device for a clutch of a power transmission of a wheeled vehicle which is simple in construction and inexpensive to manufacture.

A still further object of the present invention is to provide an electric control device which can be readily installed in an existing power transmission having a gearshift lever without any significant changes or modifications thereof.

These and other objects and advantages of the present invention will become more apparent from the following description when taken in conjunction with the accompanying drawings, in which.

Figure 1:
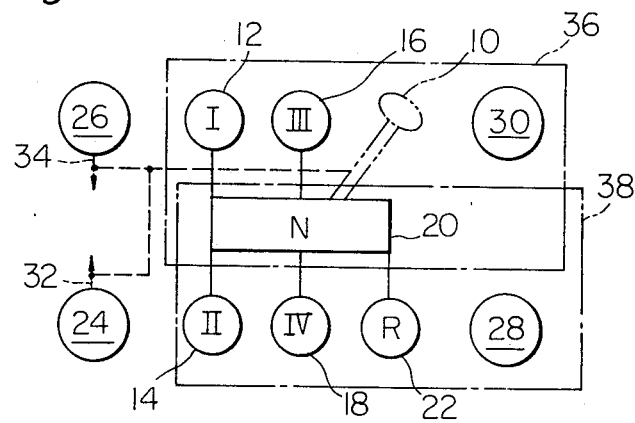
FIG. 1 is a diagrammatic view of an embodiment of a clutch control device of the invention showing its control functions.

Referring now to FIG. 1 of the drawings, there is diagrammatically shown an example of operating positions of a gearshift lever of a power transmission of a wheeled vehicle. A gearshift lever 10 is movable between first, second, third and fourth gear positions 12, 14, 16 and 18 respectively, and neutral and reverse drive positions 20 and 22. In this embodiment of the present invention, the electric control device is comprised of first, second, third and fourth switches 24, 26, 28 and 30, which are arranged in a manner that will be hereinafter described in detail. The first and second switches 24 and 26 operatively engage with the gearshift lever 10, and open and close when the gearshift lever 10 is manipulated as will be described. The third and fourth switches 28 and 30 also operatively engage with the gearshift lever 10 and may cooperate with a mechanical linkage such as a striking rod (not shown). In FIG. 1, an arrow 32 indicates a direction in which the gearshift lever 10 is pushed. When the gearshift lever 10 moves in this direction, the first switch 24 closes but the second switch 26 remains open. Likewise, an arrow 34 indicates a direction in which the gearshift lever 10 is pulled. When the gearshift lever 10 moves in this direction, the second switch 26 closes but the first switch 24 remains open. If there is no movement of the gearshift lever 10, both the switches 24 and 26 are open. Indicated as 36 is a range in which the fourth switch 30 is closed. As seen in FIG. 1, the fourth switch 30 is closed when the gearshift lever 10 is in the first, third or neutral gear positions 12, 16, and 20 respectively, and is open otherwise. Indicated as 38 is a range in which the third switch 28 is closed. The third switch 28 is closed when the gearshift lever 10 is in the second, fourth, reverse or neutral gear positions 14, 18, 22 and 20 respectively and open otherwise.

Figure 2:
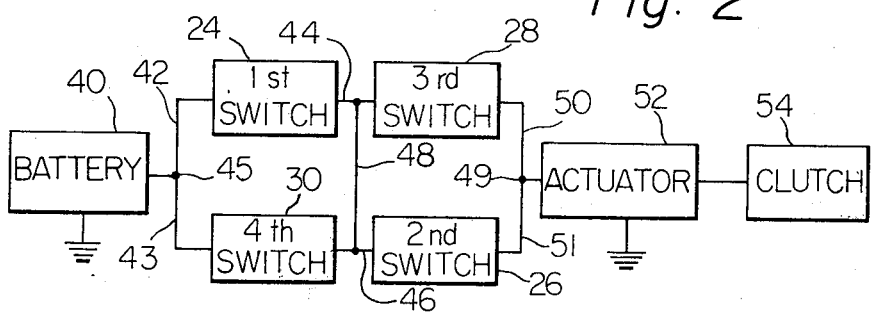
FIG. 2 is an electric block diagram of the embodiment of the control device of FIG. 1.

FIG. 2 shows a circuit arrangement of this embodiment of an electric control device according to the present invention. As shown, the electric control device includes an electric source such as a battery 40, to which the first and fourth switches 24 and 30 are connected through lines 42 and 43 respectively at a junction 45. The other side of the first switch 24 is connected to the third switch 28 through a line 44, while the other side of the fourth switch 30 is connected to the second switch 26 through a line 46. The lines 44 and 46 are connected together by a line 48. The other sides of the second and third switches 26 and 28 are in turn connected through lines 51 and 50 at a junction 49 to an electric actuator 52 which controls the operation of a clutch 54 of a power transmission of a motor vehicle (not shown). The electric acutator 52 may be of any suitable type such as a relay or solenoid. A relay is suitable if the clutch is to be electromagnetically operated. In contrast, a solenoid is suitable if the clutch is to be operated by fluid under pressure. It should be noted that the electric actuator 52 is arranged to disengage the clutch 54 to disconnect the transmission from the engine when the acutator 52 is energized.

Figure 4:
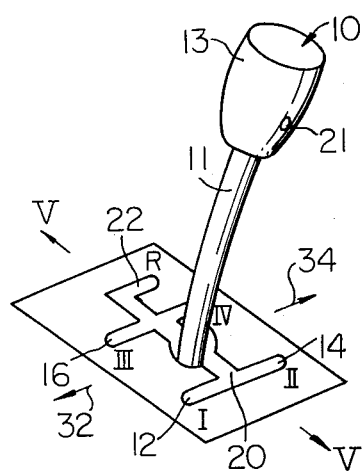
FIG. 4 is a schematic view of the gearshift lever incorporating therein switches forming part of the present invention.
Figure 5:
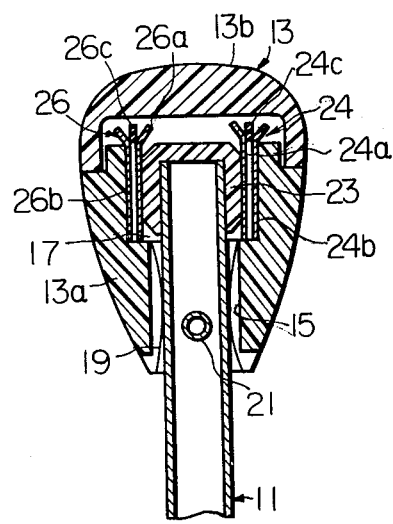
FIG. 5 is a cross section taken on line V—V of FIG. 4 showing a preferred example of the switches shown in FIGS. 1 and 2.
Figure 6:
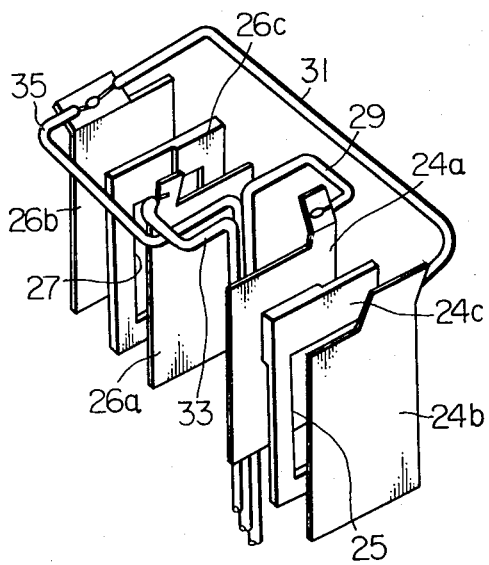
FIG. 6 is a perspective view showing the switches of FIG. 5.

Preferred examples of the switches 24 and 26 will now be described with reference to FIGS. 4, 5 and 6. As shown, the gearshift lever 10 has a lever portion 11 and a knob portion 13. As best shown in FIG. 5, the knob portion 13 is comprised of a body 13a and a body cover 13b both made of insulating material. The body 13a has an axially extending bore 15 and a cavity 17 formed therein through which an upper portion of the lever portion 11 extends. A spring washer 19 is located between the outer surface of the lever portion 11 and an inner wall surface of the bore 15 of the body 13a for a reason to be subsequently described. A pivot shaft 21 extends through bores formed in the body 13a, the spring washer 19 and the lever portion 11, and supports the body 13a in tiltable relationship with respect to the lever portion 11. To this end, the shaft 21 is arranged to extend in a direction vertical to the directions 32 and 34 as seen in FIG. 4. Indicated at 23 is an insulating member which is fixed on the lever portion 11 at the upper end thereof. The switches 24 and 26 are disposed in the cavity of the body 13a between the outer peripheral wall of the member 23 and the inner wall of the cavity 17 in opposed relationship. The switch 24 comprises inner and outer contacts 24a and 24b, and an intermediate member 24c disposed therebetween. The intermediate member 24c is made of an insulating material and has an opening 25. Likewise, the switch 26 comprises inner and outer contacts 26a and 26b, and an intermediate member 26c disposed therebetween. The intermediate member 26c is made of an insulating material and has an opening 27. The contacts 24a, 24b, 26a and 26b are electrically connected to leads 29, 31, 33 and 35, respectively, which extend through the lever portion 11. The body cover 13b is fixed to the body 13a by some suitable fastner means such as a screw. With this construction, if the vehicle driver moves the gearshift lever 10 in a direction shown by the arrow 32, then the knob portion 13 tilts counterclockwise about the shaft 21 as viewed in FIG. 5 so that the edge of the member 23 pushes the inner contact 24a rightward as viewed in FIG. 5. In this condition, the inner contact 24a bends at its central portion and the bent portion is caused to contact the opposing side face of the outer contact 24b and, thus, the switch 24 is closed. In contrast, the gearshift lever 10 is pulled in a direction shown by an arrow 34, then the knob portion 13 tilts clockwise as viewed in FIG. 5 and leftside edge of the member 23 causes the switch 26 to be closed. It is to be noted that, when the gearshift lever 10 is not biased in either direction, the knob portion is held in a position shown in FIG. 5 by the action of the spring washer 19 and the switches 24 and 26 are held in their open states.

Figure 7:
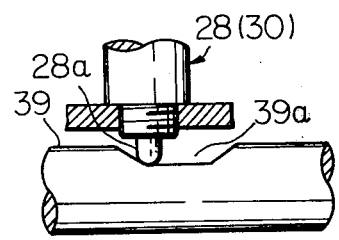
FIG. 7 is a schematic view illustrating a preferred example of the other switches shown in FIGS. 1 and 2.

A preferred example of the switches 28 and 30 will now be described with reference to FIG. 7. The switches 28 and 30 are similar in construction and, therefore, a description will be made only for the switch 28 for the sake of simplicity. The switch 28 may be of a known microswitch type having a movable member 28a. The movable member 28a is arranged to respond to the position of the striking rod 39 having formed therein a cutout 39a. The switch 28 is closed when the movable member 28a engages with the bottom surface of the cutout 39a, while, when the movable member 28a engages with one of the slanted edges of the cutout 39a, the switch 28 is open. It will be noted that the striking rod 39 is provided with a plurality of cutouts so as to cause the switch 28 to be closed when the striking rod moves to the second, fourth, reverse or neutral gear positions 14, 18, 22 and 20.

With the arrangement described hereinabove, if the power transmission is in its neutral position 20, the third and fourth switches 28 and 30 are closed even if the driver does not touch the gearshift lever 10. Thus, an electric circuit is completed between the battery 40 and the electric actuator 52 through the switches 28 and 30, and the electric actuator 52 is energized so that the clutch 54 is disengaged.

If the gearshft lever 10 is pushed in the direction shown by the arrow 32 to shift into the first gear position 12, the first switch 24 closes. When the gearshift lever 10 reaches the first gear position 12 the third switch 28 opens, and the electric circuit is broken between the battery 40 and the electric actuator 52. Thus, the electric actuator 52 is de-energized so that the clutch 54 disengages and the vehicle may be driven in first gear.

If the gearshift lever 10 is pulled in the direction shown by the arrow 34 to shift into the second gear position 14, the second switch 26 closes, thus completing an electric circuit to the actuator 52 through the switches 26 and 30. During this operation of the gearshift lever 10, the 3rd switch 28 closes as the gearshift lever 10 passes between the first and neutral positions 12 and 20 respectively, and the fourth switch 30 opens as the gearshift lever 10 passes between the neutral and second gear positions 20 and 14 respectively. Thus, the electric actuator 52 remains energized until the gearshift lever 10 just reaches the second gear position 14 and is then de-energized to engage the clutch and allow the vehicle to be driven.

If the gearshift lever 10 is pushed in the direction shown by the arrow 32 to shift into the third gear position 16, the first switch 24 closes and remains closed until the shifting operation is completed. During this movement of the gearshift lever 10 the operation of the switches 28 and 30 is similar to that described in reference to shifting between the first and second gear positions 12 and 14, but is in reverse order. Thus, the clutch 54 is disengaged during the shifting operation (until the gearshift lever 10 just reaches the second gear position 16) and is then engaged.

During shifting from the third to the fourth scar positions 16 and 18 respectively, the operation of the switches 24, 26, 28 and 30 is identical to that of the shifting operation between the first and second gear positions 12 and 14 respectively.

It will be understood that when the gearshift lever 10 is in it first or third gear position 12 or 16 respectively, the clutch 54 is engaged because only the fourth switch 30 is closed to de-energize the electric actuator 52. In this case, the clutch 54 is disengaged merely by pulling the gearshift lever 10 because the second switch 26 closes to complete an electric circuit and energize the electric actuator 52. It will also be understood that when the gearshift lever 10 in the second gear position 14, fourth gear position 18 or reverse drive position 22, the clutch 54 is engaged to allow the vehicle to be driven because only the third switch 28 is closed to de-energize the electric actuator 52. From these positions, if the gearshift lever 10 is pushed, the first and third switches 24 and 28 are closed to energize the electric acutator 52 thereby disengaging the clutch 54. It will further be noted that when the gearshift lever 10 is in the neutral position 20, the third and fouth switches 28 and 30 are closed to energize the electric actuator 52 thereby maintaining the clutch 54 disengaged.

Figure 3:
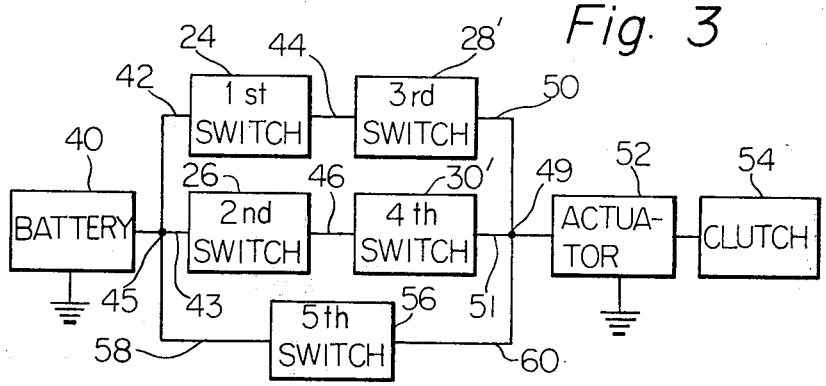
FIG. 3 is an electric block diagram of another preferred embodiment of a control device according to the present invention.

Another preferred embodiment of the present invention is illustrated in FIG. 3, in which like or corresponding component parts are designated by the same reference numerals as those used in FIGS. 1 and 2 except that a prime symbol (') has been added to some elements. In this illustrated embodiment, a third switch 28' is closed when the gearshift lever 10 is in the second gear position 14, fourth gear position 18 or reverse drive position 22, but not in the neutral position 20. A fourth switch 30' is closed when the gearshift lever 10 is in the first gear position 12 or third gear position 16, but not in the neutral position 20. Indicated as 56 is a fifth switch which is closed when the gearshift lever 10 is in the neutral position 20. In the illustrated embodiment of FIG. 3, the electric control device comprises the battery 40, to which the first switch 24, second switch 26 and fifth switch 56 are connected through the lines 42, 43 and a line 58 at the junction 45. The outer side of first switch 24 is connected through the line 44 to the third switch 28', the other side of which is connected through the line 50 to the electric actuator 52. The other side of the second switch 26 is connected through the line 46 to the fourth switch 30', the other side of which is connected through the line 51 to the electric actuator 52. The other side of the fifth switch 56 is connected through a line 60 to the electric actuator 52. The line 50, 51 and 60 are connected to each other at the junction 49. In this embodiment, the line 48 is emitted.

The electric control device thus arranged operates in a manner similar to that of the device shown in FIG. 2. For example, when the gearshift lever 10 is in the second gear position 14, fourth gear position 18 or reverse drive position 22, the third switch 28' is closed. However, if the driver does not touch the gearshift lever 10, the first switch 24 is open. Accordingly, there is not a complete electric circuit between the battery 40 and the electric actuator 52, so that the actuator 52 is de-energized and the clutch 54 is engaged. If, on the contrary, the driver pushes the gearshift lever 10 in the direction shown by the arrow 32, the first switch 24 closes to complete an electric circuit between the battery 40 and the electric actuator 52. Consequently, the electric actuator 52 is energized to disengage the clutch 54. Likewise, when the gearshift lever 10 is in the first gear position 12 or the third gear position 16, the fourth switch 30' is closed. However, if the driver does not touch the gearshift lever 10, the second switch 26 is open and the electric actuator 52 is de-energized. Thus, the clutch 54 is engaged. If the driver pulls the gearshift lever 10 in the direction shown by the arrow 34, the second switch 26 closes so that electric current is fed to the electric actuator 52 thereby disengaging the clutch 54. If the gearshift lever 10 is in the neutral position 20, the fifth switch 56 is closed to establish an electric circuit between the battery 40 and the electric actuator 54. Thus, the electric actuator 54 is energized so that the clutch is disengaged.

It will now be appreciated from the foregoing description that, in an electric control device according to the present invention, a clutch of a power transmission is held disengaged when a gearshift lever is in a neutral position, and when the gearshift lever is moved to a drive gear position, a switching arrangement cooperating therewith quickly operates to engage the clutch to facilitate quick shifting of gears of the power transmission whereby delayed engagement of clutch is prevented and, therefore, undesirable effects such as engine racing and abrasion of the clutch faces are eliminated.

What is claimed is:

1. An electric control device to control a clutch of a power transmission having a gearshift lever movable to first, second, third and fourth gear positions, a neutral position and a reverse drive position, said device comprising, in combination, an electric power source, a first switch connected to said electric power source and cooperating with said gearshift lever, said first switch closing when said gearshift lever is moved in one direction, a second switch connected to said first switch and cooperating with said gearshift lever, said second switch closing when said gearshift lever is moved in another direction, a third switch connected in parallel with said second switch and cooperating with said gearshift lever, said third switch closing when said gearshift lever is moved to one of said second and third gear positions, said neutral position and said reverse drive position, a fourth switch connected in parallel with said first switch and cooperating with said gearshift lever, said fourth switch closing when said gearshift lever is moved to one of said first and third gear positions and said neutral position, and an electric actuator connected to said second and third switches to actuate said clutch of said power transmission.

2. An electric control device to control a clutch of a power transmission having a gearshift lever movable to first, second, third, and fourth gear positions, a neutral position and a reverse drive position, said device comprising, in combination, an electric power source, a first switch connected to said electric power source and cooperating with said gearshift lever, said first switch closing when said gearshift lever is moved in one direction, a second switch connected to said electric power source and cooperating with said gearshift lever, said second switch closing when said gearshift lever is moved in another direction, a third switch connected to said first switch and cooperating with said gearshift lever, said third switch closing when said gearshift lever is moved to one of said second and fourth gear positions and said reverse drive position, a fourth switch connected to said second switch and cooperating with said gearshift lever, said fourth switch closing when said gearshift lever is moved to one of said first and third gear positions, a fifth switch connected to said electric power source in parallel with said first and third switches and said second and fourth switches respectively and cooperating with said gearshift lever, said fifth switch closing when said gearshift lever is moved to said neutral position, and an electric actuator connected to said third, fourth and fifth switches to actuate said clutch of said power transmission.

* * * * *